United States Patent [19]

Possati et al.

[11] Patent Number: 5,086,569
[45] Date of Patent: Feb. 11, 1992

[54] APPARATUS FOR CHECKING DIMENSIONS OF WORKPIECES

[75] Inventors: Mario Possati; Guido Golinelli, both of Bologna, Italy

[73] Assignee: Marposs Societa' Per Azioni, S. Marino di Bentivoglio, Italy

[21] Appl. No.: 381,647
[22] PCT Filed: Nov. 3, 1988
[86] PCT No.: PCT/IT88/00078
§ 371 Date: Jun. 16, 1989
§ 102(e) Date: Jun. 16, 1989
[87] PCT Pub. No.: WO89/04456
PCT Pub. Date: May 18, 1989

[30] Foreign Application Priority Data

Nov. 9, 1987 [IT] Italy ................. 3683 A/87

[51] Int. Cl.⁵ .............................. G01B 5/20
[52] U.S. Cl. ........................ 33/549; 33/550; 33/551; 33/555.1; 33/569; 33/573; 33/568
[58] Field of Search .............. 33/549, 550, 551, 552, 33/553, 554, 555.1, 568, 569, 572, 578, 783, 805, 573

[56] References Cited

U.S. PATENT DOCUMENTS

| | | | |
|---|---|---|---|
| 2,609,609 | 9/1952 | Moss | 33/549 |
| 2,625,773 | 1/1953 | Cramer et al. | |
| 2,688,802 | 9/1954 | Jones | 33/805 |
| 3,350,785 | 11/1967 | Rawstron et al. | 33/549 |
| 3,795,055 | 3/1974 | Zucco | 33/550 |
| 3,905,116 | 9/1975 | Roberts | |
| 4,473,951 | 10/1984 | Golinelli et al. | 33/783 |
| 4,531,294 | 7/1985 | Lenz | 33/555.1 |
| 4,625,413 | 12/1986 | Possati et al. | 33/551 |
| 4,811,524 | 3/1989 | Corallo | 33/783 |
| 4,914,827 | 4/1990 | Cook | 33/549 |

FOREIGN PATENT DOCUMENTS

837608 4/1952 Fed. Rep. of Germany.
1507371 12/1967 France.

Primary Examiner—William A. Cuchlinski, Jr.
Assistant Examiner—William C. Dowling
Attorney, Agent, or Firm—Stevens, Davis, Miller & Mosher

[57] ABSTRACT

An apparatus for checking features of workpieces with rotational symmetry defining a geometrical axis, which includes a base, rest devices fixed to the base for supporting the workpiece with the geometrical axis horizontally arranged, and a support structure coupled to the base for rotation about a horizontal axis. A counterweight and sensor are coupled to the support structure and movable with the support structure from a rest position, allowing loading of the workpiece to be checked onto the rest devices to a working position where the sensor is brought into cooperation with the workpiece. The axis of rotation of the support structure is arranged below the axis of the workpiece, in correspondence to a vertical geometrical plane passing through the workpiece geometric axis when the workpiece is positioned on the rest devices.

21 Claims, 9 Drawing Sheets

APPARATUS FOR CHECKING DIMENSIONS OF WORKPIECES

TECHNICAL FIELD

The present invention relates to an apparatus for checking features of workpieces with rotational symmetry defining a geometrical axis, comprising support and protection means with a base, rest devices fixed to the base for supporting the workpiece with the geometrical axis horizontally arranged, and a support structure coupled to the base and rotating about a horizontal axis; control means; and sensing means coupled to the support structure and movable with it from a rest position, to allow the loading of the workpiece to be checked on the rest devices, to a working position for bringing the sensing means in cooperation with the workpiece.

BACKGROUND ART

An apparatus comprising all the above features is described in U.S. Pat. No. US-A-3905116 to Roberts. In particular, said patent relates to a crankshaft measuring apparatus including a main frame which carries two preliminary alignment V blocks, a headstock with a spindle nose and a tailstock with a dead centre, for supporting the crankshaft to be checked, and a carriage. The carriage comprises a part supporting a probe, said part being pivotable about an axis parallel to the axis defined by nose and dead centre.

In this known apparatus the axis of rotation of the structure carrying the sensing means, that is the probe, is arranged substantially beside and behind with respect to the position of the workpiece geometrical axis defined by the rest devices - that consist in the spindle nose and the dead centre -, by considering as front and rear parts of the apparatus those located at the operator's side and the opposite side, respectively. Consequently, the accessibility of the apparatus during the workpiece loading and unloading phases is not satisfactory, the overall dimensions in a transversal and/or vertical direction are considerable and there are also considerable risks of the workpiece possibly colliding against and damaging the sensing means.

DISCLOSURE OF INVENTION

The object of the present invention is to overcome the drawbacks of the known apparatus.

A further object is that of achieving a modular, robust, inexpensive and reliable structure.

According to the invention, an apparatus for checking features of workpieces with rotational symmetry defining a geometrical axis, comprises support and protection means with a base, rest devices fixed to the base for supporting the workpiece with the geometrical axis horizontally arranged, and a support structure coupled to the base; control means; and sensing means coupled to the support structure. The support structure can rotate about a horizontal axis arranged below the axis of the workpiece, in correspondence to a vertical geometrical plane passing through the workpiece geometric axis when the workpiece is positioned on the rest devices. The sensing means are movable with the support structure from a rest position, to allow the loading of the workpiece to be checked on the rest devices, to a working position for bringing the sensing means in cooperation with the workpiece.

The effects and advantages offered by the invention are that the apparatus has small overall dimensions, that it guarantees safe protection of the sensing means especially during the manual or automatic loading phases, high accuracy and reliability, and in addition a convenient accessibility in the case of manual operation.

The sensing means have feelers which are brought to the checking position in such a way that the displacement required for contacting the workpiece always substantially occurs along tangents that are horizontally arranged.

Further advantages attained by the present invention are: an easy insertion, when required, of various components in the apparatus, a simple continuous adjustment of the mutual position of the various components, the possibility of performing additional adjustments for some of these components in order to keep accuracy and repeatability characteristics unaltered as the nominal dimensions of the workpiece to be checked vary.

BRIEF DESCRIPTION OF DRAWINGS

Specific embodiments of the invention are now described in detail with reference to the enclosed tables of drawings, given by way of example and not of limitation, in which.

BEST MODES FOR CARRYING OUT THE INVENTION

Figure 1:
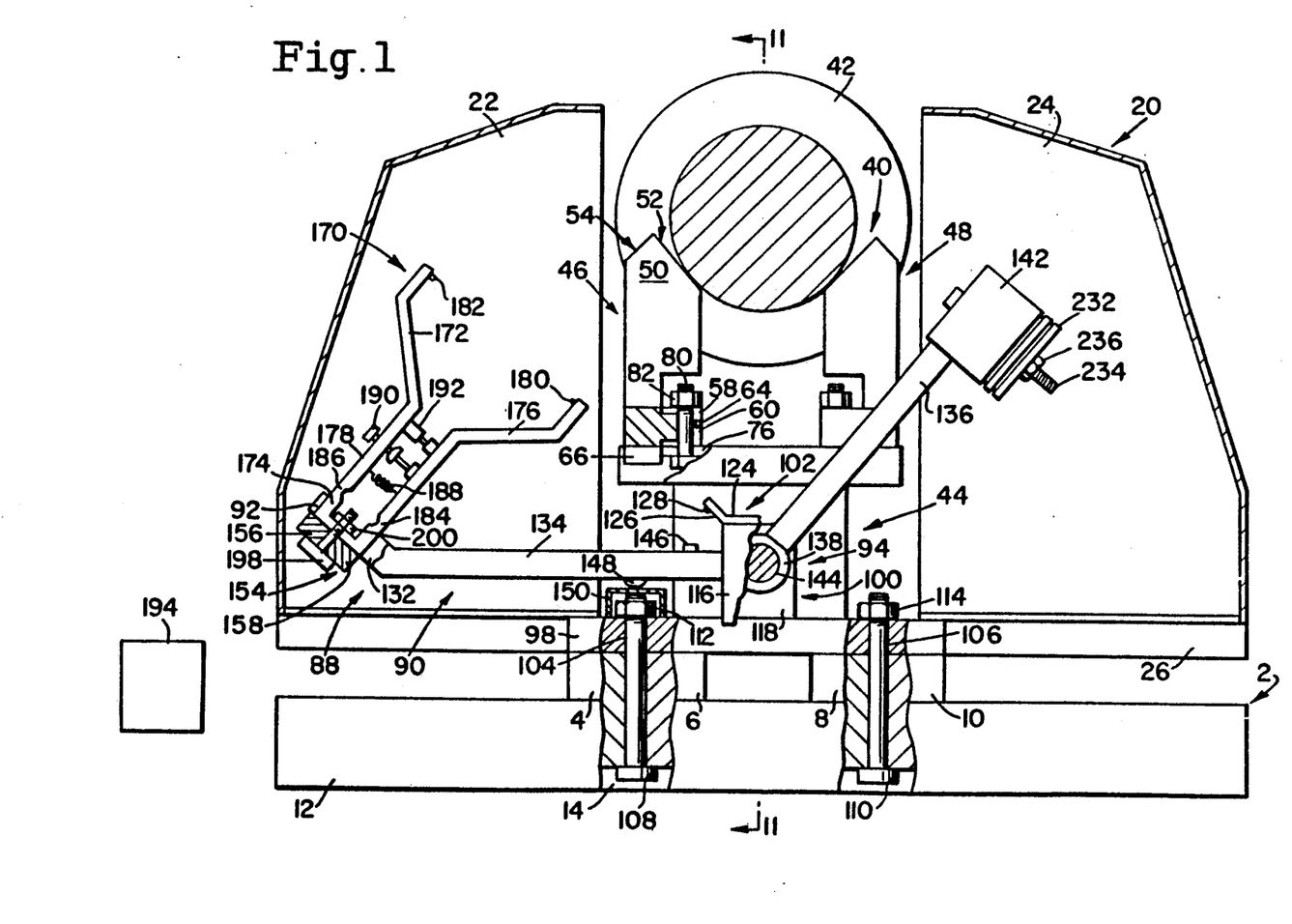
FIG. 1 is a transversal partially sectional view of a bench gauge according to the present invention with some parts furtherly sectioned in order to evidence some details.
Figure 2:
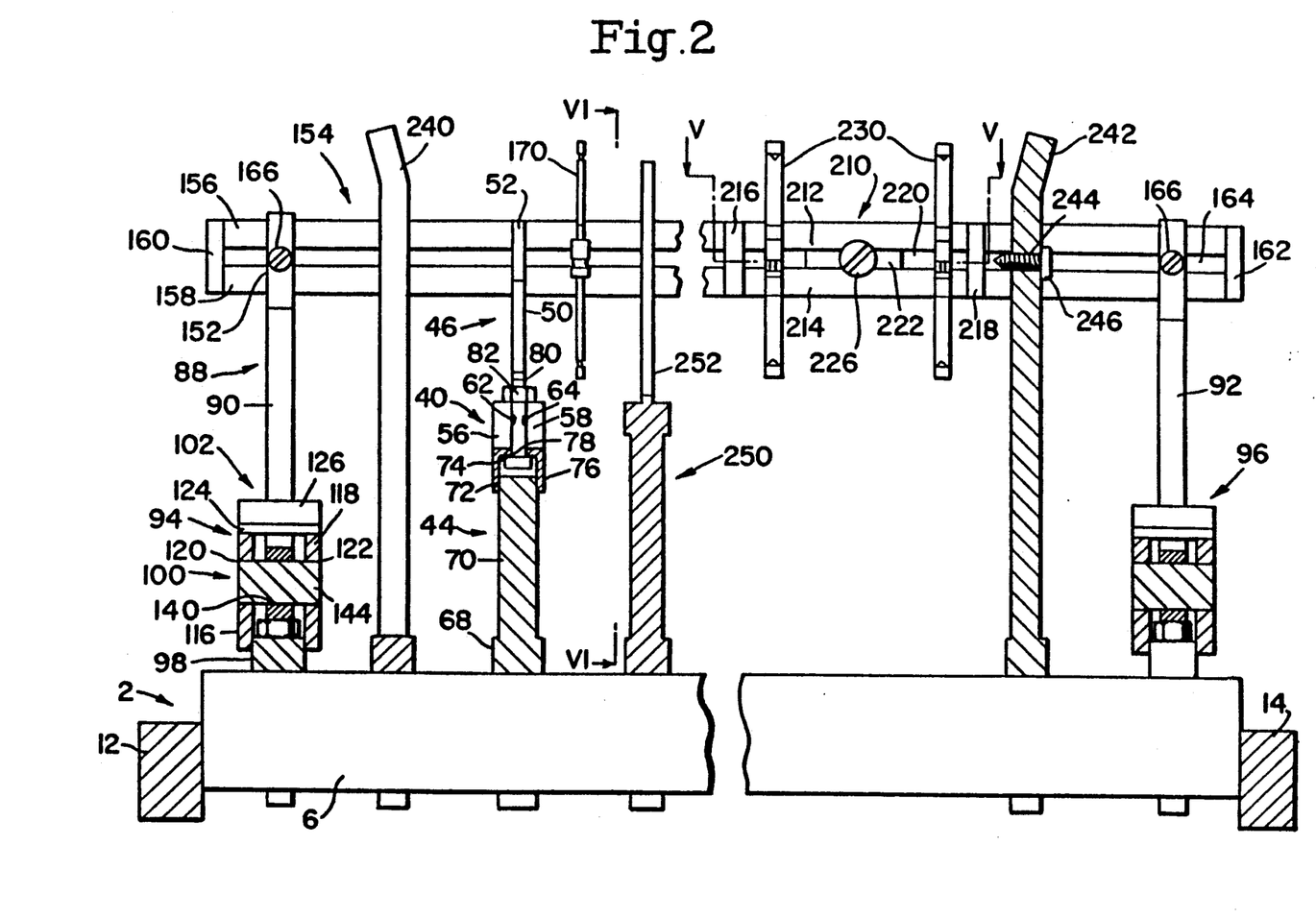
FIG. 2 is a longitudinal sectional view of the bench gauge shown in FIG. 1 along the path II-II in FIG. 1, with the omission of some elements and others placed in a different position with respect to FIG. 1, for clarity reasons.

The bench gauge shown in FIGS. 1 and 2 comprises support and protection means including a base, or bed 2

(also shown in FIG. 3), with two pairs of longitudinal bars having a rectangular cross-section 4, 6 and 8, 10 fixed at their ends in a mutually parallel way to two crosspieces 12 and 14. Coupling may be made, for example, by welding. Longitudinal openings 16 and 18 defined by the pairs of longitudinal parallel bars 4, 6 and 8, 10, respectively, form longitudinal guides.

Support and protection means further comprise a protection structure 20 (also shown in FIGS. 4A and 4B) with two halfshells 22 and 24 joined at the base by two parallel flat bars 26 and 28.

Figures 3, 4A, 4B, 5:
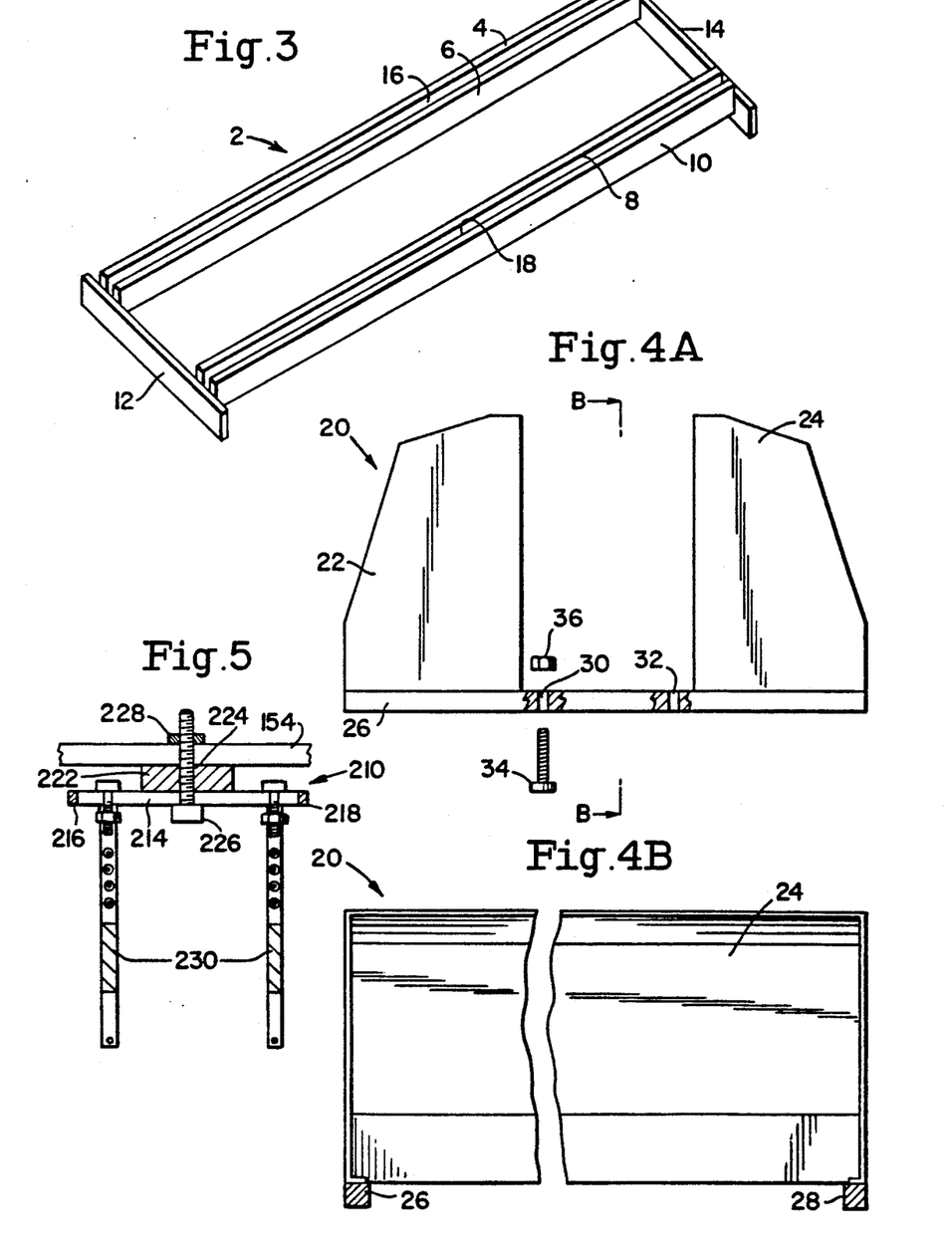
FIG. 3 is a perspective view of a detail of the bench gauge shown in FIGS. 1 and 2, with a different scale as compared to that of FIGS. 1 and 2.
FIGS. 4A and 4B are respectively a front view with some details in a sectional view and a longitudinal sectional view along the path B-B in FIG. 4A, of a second detail of the bench gauge shown in FIG. 1, with a different scale as compared to that of FIG. 1.
FIG. 5 is a sectional view of a third detail of the bench gauge shown in FIG. 2, along the path V—V in FIG. 2.

Structure 20 is positioned on bed 2 in such a way that the flat bars 26, 28 are arranged in a transversal position with respect to the two pairs of bars 4, 6 and 8, 10. Both flat bars 26, 28 have two through holes 30 and 32 (just those of flat bar 26 are shown in FIG. 4A) formed in such positions so as to arrange themselves in correspondence to openings 16 and 18, respectively. Structure 20 is secured to bed 2 by means of bolts (as an screws 34 with a hexagonal head inserted in openings 16 (18) and in through holes 30 (32), and of nuts 36 that are fastened to said screws so contacting against the upper surface of flat bars 26, 28; the heads of screws 34 are thus urged against the bottom surface of bars 4, 6 (8, 10).

Support and protection means comprise two rest devices 40 (only one is shown in FIG. 1), for supporting a workpiece 42 to be checked with its geometrical axis horizontally arranged. The rest devices 40 comprise support members 44 arranged on base 2 according to mutually parallel transversal directions and pairs of reference elements 46, 48 each adapted for being secured to one of said members 44. The reference elements, and more specifically element 46, have a first portion 50 with two rest surfaces 52 and 54 that have a different inclination, adapted for being arranged in a symmetrical way with respect to similar surfaces of element 48 and about an axis defined by associated support member 44, in such a way so as to define V-shaped rests for workpiece 42 with different sloping surfaces if the sides of the V are the pairs of surfaces 52 or 54 respectively.

Reference element 46 (just like element 48) further comprises a clamping portion with two parallel blocks 56 and 58 coupled, for example welded, to the first portion 50 and with a free end, that define an opening 60; the width of said opening 60 is limited, near the free ends of blocks 56 and 58, by welding spots 62 and 64. An end part of portion 50 opposite to rest surfaces 52 and 54 forms a centering overhang 66.

Support member 44 basically comprises three parts: a coupling portion 68, a central body 70 and a support part 72. The coupling portion 68, shown in FIG. 2 only, comprises two through holes for the coupling of the whole rest device 40 to bed 2, and more specifically to the pairs of longitudinal bars 4, 6 and 8, 10, in a completely similar way as that described for the protection structure 20. Portion 68 of member 44 is fully identical to a part 98 shown in FIGS. 1 and 2 (and pertaining to another device of the bench gauge) that will be described hereinafter and is coupled to bed 2 in the same way as this one. It should be realized that this particular method of coupling enables a continuous adjustment of the longitudinal position of the rest devices 40.

Support part 72 comprises two elongated portions with an "L" shaped section 74 and 76, coupled near the upper edges of the central body 70 in such a way that the bases of the Ls face each other so as to form a transversal seat 78. The fixing of each of reference elements 46, 48 to coupling portion 68 of support member 44 is made in the following way: element 46 (48) is placed on body 70 so that overhang 66 is inserted in seat 78 and blocks 56 and 58 rest on portions 74 and 76, respectively. A screw 80 is inserted between portions 74, 76 in such a way that its threaded part protrudes in between the bases of the Ls in seat 78 and is inserted in opening 60 of element 46 (and is held there thanks to welding spots 62, 64 that limit the opening width at the open end). A nut 82 locked at the end of screw 80 urges against surfaces of blocks 56, 58, and consequently the head of screw 80 is clamped against internal surfaces of sections 74, 76. This clamping of screw 80 and the cooperating of overhang 66 against the surfaces of seat 78 so bring about the locking of element 46 to support member 44. In an entirely similar way element 48 is also clamped to support member 44.

The possibility of adjusting the mutual position of the reference elements 46, 48 in a transversal direction as above described and the availability of two pairs of rest surfaces (52 and 54) with a different inclination enable rest devices 40 to ensure a correct positioning of workpieces 42 to be checked as the nominal dimensions of the different workpieces (and/or of different sections of a same workpiece) vary—within a broad range—, while maintaining substantially constant the position of the workpiece axis.

The support and protection means include also a support structure 88 comprising two rotary arms 90 and 92 and support devices or supports 94 and 96 secured to bed 2, the rotary arms 90 and 92 being connected to supports 94 and 96, respectively. As the arms 90, 92 and associated supports 94, 96 are similar to each other, the description hereinafter refers to arm 90 and associated support 94 only, as shown in FIGS. 1 and 2.

Support 94 comprises a portion 98 for coupling to bed 2, a fulcrum section 100 that defines, together with the corresponding fulcrum section of support 96, an axis of rotation for arms 90, 92 and for the entire support structure 88, and a limit stop part 102.

Portion 98 has two through holes 104 and 106, specifically placed in positions so as to be arranged in correspondence to openings 16 and 18, respectively, when support 94 rests on bed 2.

Support 94 is secured to bed 2 by means of bolts consisting in screws 108, 110 that are inserted in openings 16, 18 and in through holes 104, 106 and nuts 112, 114 that are locked to said screws urging against the upper surface of portion 98; the heads of screws 108, 110 are thus urged against the bottom surface of the pairs of bars 4, 6 and 8, 10.

The fulcrum section 100 comprises two rectangular plates 116, 118, having edges coupled (for example welded) to portion 98, so as to arrange themselves in a vertical and parallel way with respect to each other. Plates 116, 118 have through holes 120, 122 that are aligned along an axis of rotation, and the plates are joined to limit stop part 102, at their edges opposite the above mentioned edges. The latter part 102 substantially comprises two rectangular reciprocally sloping portions 124, 126, one of which, 124, is horizontally arranged and coupled (welded) to the edges of plates 116, 118, as previously mentioned; the other portion, 126, carries a reference abutment 128.

Rotary arm 90 comprises: a first elongated portion 132, a second elongated portion 134—angularly coupled to the first—a third elongated portion 136 with a circular cross-section, an annular portion 138—that connects said second and third elongated portions 134 and 136 in such a way that these portions 134, 136 are reciprocally sloping —the annular portion 138 comprising a hole 140 with an axis arranged transversally with respect to elongated portions 134, 136, and a counterweight end portion 142 connected to the third elongated portion 136.

Arm 90 is inserted between plates 116, 118 of fulcrum section 100 of support 94, in such a way that the transversal axis of hole 140 is aligned with the above mentioned axis of rotation.

A cylindrical pin 144 is inserted through hole 140 of portion 138 and holes 120, 122 of plates 116, 118 so as to connect arm 90 to support 94 in such a way that the latter may rotate about said axis of rotation.

A first reference abutment element 146 is fixed to the second elongated portion 134 and is adapted for cooperating with reference abutment 128 for limiting the rotation of arm 90 in a clockwise direction (as shown in FIG. 1). A second reference abutment element 148 is coupled to portion 134, opposite to element 146, and a limit stop cap 150 is coupled to nut 112; element 148 and limit stop cap 150 cooperate for limiting the rotation of arm 90 in a direction opposite to the previously mentioned one.

The first portion 132 of arm 90 has a through hole 152.

The support structure 88 also comprises a frame 154, shown in FIG. 2, with two bars 156, 158 connected by segments 160, 162 coupled (welded) at their ends in such a way that bars 156, 158 are parallel and separated by a longitudinal opening 164 that forms a guide. Frame 154 is coupled to rotary arms 90, 92: more specifically it is fixed to the first elongated portions 132 by means of screws 166, that are inserted through holes 152 and opening 164 and then locked by nuts 168, according to the same method of clamping the various parts of the bench gauge to bed 2.

Sensing or measuring means comprise gauges 170 of the "snap" type (only one of them is shown in FIG. 1) with an integral element 172 that has a coupling portion 174, two shaped end portions 176, 178 that carry feelers 180, 182 adapted for contacting the surface of workpiece 42, and two portions with a thinner section 184, 186 between the end portions and the coupling portion. The portions that have a thinner section 184, 186 allow end portions 176, 178 to accomplish limited rotational displacements with respect to the coupling portion 174. Resilient means 188 adapted for urging the end portions 176, 178 to a mutual approach, limiting means 190 adapted for limiting the reciprocal displacements of end portions 176, 178 and transducer means 192 adapted for emitting electrical signals that depend on said mutual displacements, are coupled to both said end portions 176, 178. Control means comprise electric cables 278, not shown in FIGS. 1 and 2 but in FIG. 7 only, which transmit signals from the transducer means 192 to connector blocks (not shown) and to processing and display units 194.

A hole in portion 174 allows the coupling of gauge 170 to frame 154 in a single limited zone by means of a screw 198 that passes through opening 164 and the aforementioned hole and is locked by a nut 200.

An additional frame 210 of the support structure 88 comprises two bars 212, 214—that are similar to bars 156, 158 but shorter—and two segments 216, 218 that join the bar ends, an opening 220 being defined between bars 212, 214 so as to provide a guide. With particular reference to FIGS. 2 and 5, a spacer block 222 arranged at the intermediate zone of frame 210 has a through hole 224 for housing a screw 226; moreover the latter is inserted through openings 220 and 164, and locked to a nut 228 so as to clamp additional frame 210 to frame 154 in a single limited zone. The sensing or measuring means comprise second gauges 230 similar to gauge 170 which are fixed to a single limited zone of additional frame 210 according to the same coupling method used for coupling gauge 170 to frame 154. However, while the transducer means 192 of gauge 170 can comprise a single transducer, each gauge 230 for diameter checking normally comprises two transducers. Moreover, further gauges for determining axial dimensions can be fixed to additional frame 210. Normally the gauges 170 carried by frame 154 are used for performing single relevant measurements, while gauges 230 carried by additional frame 210 are used for carrying out combined measurements (by processing the signals of gauges 230).

The counterweight end portion 142 has a substantially parallelepiped shape and is adapted for balancing the weight of the sensing means 170, 230 coupled to frames 154 and 210 located at the opposite side of rotary arm 90.

As the number of gauges 170 on frame 154 can vary and/or depending on the presence or not of frame 210 with relevant gauges 230, it is possible to add to the counterweight end portion 142 control means consisting of additional elements 232, coupled by means of a screw 234 that crosses portion. 142 and elements 232 by passing through holes that are not shown in FIG. 1, and is locked by a nut 236. In this way it is possible to keep substantially constant the force required to make arms 90, 92 rotate and bring gauges 170, 230 on to workpiece 42 to be checked.

The shape and the positioning of rest devices 40 and supports 94, 96 of rotary arms 90, 92 are such that the axis of rotation of the support structure 88 and the axis of the workpiece 42 to be checked lie, the first below the second, in a vertical geometrical plane coincident with the viewing plane of FIG. 2.

This arrangement enables to achieve a considerable reduction in the overall dimensions of the whole apparatus and simplifies the (manual or automatic) loading the workpiece 42 on the rest devices 40 and at the same time protects the sensing means 170, 230, that are conveniently arranged apart from these devices.

The particular coupling of gauges 170 to frame 154 by means of just one bolt further prevents each of the sensing means 170 from being affected by possible plays due to inexact alignment of the axes of rotation of arms 90, 92, and/or bending of some parts of the apparatus. A similar advantage is ensured to the second sensing means 230 coupled to the additional frame 210 in turn coupled by just one bolt to frame 154: possible misalignments among a plurality of gauges 230 coupled to additional frame 210 due, for example, to clearances in the rotations of arms 90, 92 are prevented, allowing an improved accuracy and flexibility in checking axial distances, concentricity, parallelisms, etc. It should be realized that frame 210 can also be connected to frame 154 by means of two bolts positioned sufficiently close together, instead of one, in order to obtain the same result.

Guide devices or bumpers 240, 242 are comprised in the support and protection means, and are coupled to bed 2 by means of bolts, in a quite similar way as for the other elements described up to now—for example like support 94 in the case of arm 90. The guide devices 240, 242 are adapted for limiting in an axial direction the positioning of workpiece 42 (that is not shown in FIG. 2 for simplicity's sake). Threaded through holes 244 in the guide devices (just the one referring to element 242 is shown in a sectional view in FIG. 2) can be used for the initial adjustment of rest devices 40. In this case pointed reference screws 246 are screwed down through said holes 244 with their points opposite to each other so as to carry a master piece in the correct position and suitably adjust rest devices 40 by setting the position of reference elements 46, 48 onto support member 44. Once the correct arrangement of rest devices 40 has been reached, pointed screws 246 are unscrewed and the workpieces 42 to be checked are directly placed on said rest devices 40.

Figure 6:
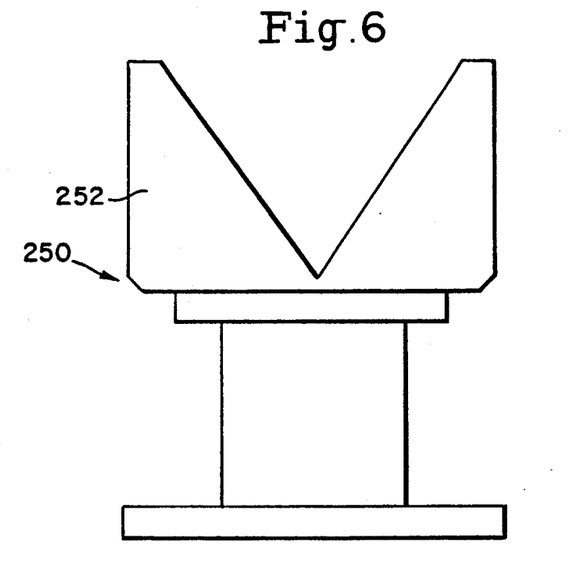
FIG. 6 shows a fourth detail of the bench gauge shown in FIG. 2, along the path VI—VI in FIG. 2.

Furthermore there can be foreseen an additional protection element 250 coupled to bed 2 in a similar way as the others (i.e. locked to the pairs of bars 4, 6 and 8, 10 by means of bolts in correspondence to a portion quite similar to portion 98 shown in FIG. 1); said element 250 is shown in FIG. 6 and comprises a substantially flat and V-shaped portion 252 adapted to be arranged parallel to rest devices 40. The function of element 250 is that of supporting workpiece 42 in the event that the positioning of the rest devices 40 (more specifically of the reference elements 46, 48) is inexact, in order to prevent the workpiece 42 from colliding against other parts of the bench gauge during, for example, the automatic loading operation.

Figure 7:
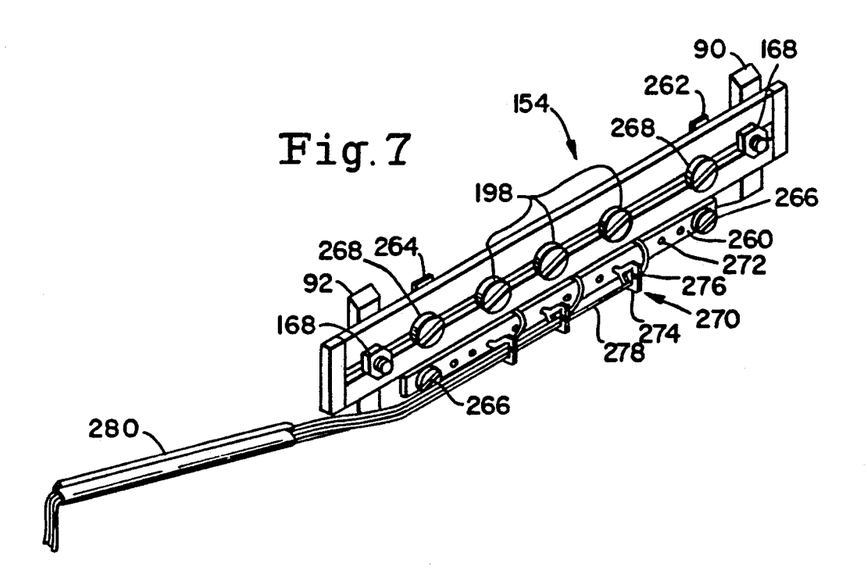
FIG. 7 is a perspective view of a detail of the bench gauge of FIGS. 1 and 2, with a different scale from that of FIGS. 1 and 2.

FIG. 7 schematically shows some details—that are not shown in the other figures—of the bench gauge described up to now, and in particular of further components of the support and protection means. A plate 260 with holes 272 is secured to and below frame 154, by means of two bridge elements 262, 264 and screws and bolts 266 and 268.

Locking elements 270 made of plastic comprise a cylindrical end (not visible in the figure) adapted for insertion in a relevant hole 272 of plate 260, and a substantially annular portion 274 with a slit 276. The locking elements 270 are inserted in holes 272 in correspondence to the position of sensing means 170, 230 coupled to frame 154 (or to additional frame 210). In FIG. 7, for simplicity's sake, the sensing means are not explicitly shown, but just indicated by associated locking screws 198. Each cable 278 coming out of transducer means 192 of a gauge 170 is inserted through slit 276, in the associated locking element 270 and in all the other elements 270 on plate 260 placed between the relevant gauge and arm 92. All cables 278 so aligned along plate 260 are inserted in a raceway 280 fixed to arm 92 and extending up to pin 144, i.e. the axis of rotation of arm 92. In this way cables 278 can integrally rotate with the movable part of the support structure (90, 92, 154) without being subject to unwanted torsions.

It should be realized that cables 278 can be led to connector blocks (as hereinbefore mentioned) and that said blocks can also be coupled to bed 2 by means of suitable supports comprising a coupling section that is under all aspects similar to portion 98 shown in FIG. 1 and coupled in the same way.

Figure 8:
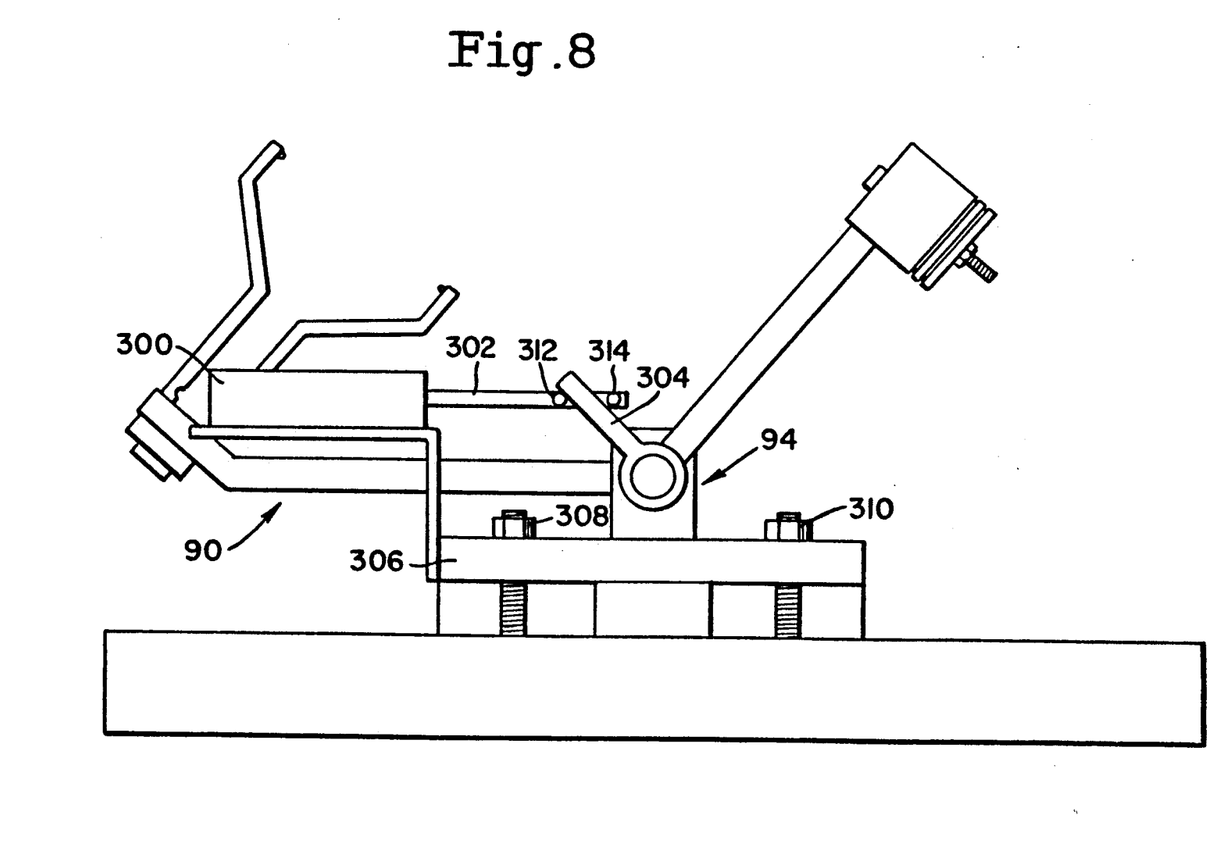
FIG. 8 is a side view of a detail of a bench gauge according to the invention.

The rotation of support structure 88, and consequently the displacement of the sensing means 170, 230 movable with it from a rest position to a working one, in cooperation with workpiece 42 to be checked, can occur in an automatic or manual way through relevant control means. In the first instance—schematically shown in FIG. 8—the control means include automatic actuation means comprising a hydraulic actuation system with a cylinder 300 and a piston with an end 302 that engages, by means of limit stop elements 312, 314, a lever 304 rigidly coupled to arm 90 and adapted for rotating about the same axis of rotation of said arm.

Cylinder 300 is coupled in a way not shown in the figure, to a support 306, in turn secured to bed 2 by means of bolts 308, 310, in a way quite similar to that used for portion 98 shown in FIG. 1.

The automatic actuation of the rotation motion can occur in a similar way by using pneumatic means.

Logic circuits can moreover be coupled to bed 2 by means of supports that are coupled to bed 2 in the way hereinabove repeatedly described (see portion 98 in FIG. 1).

Figure 9A:
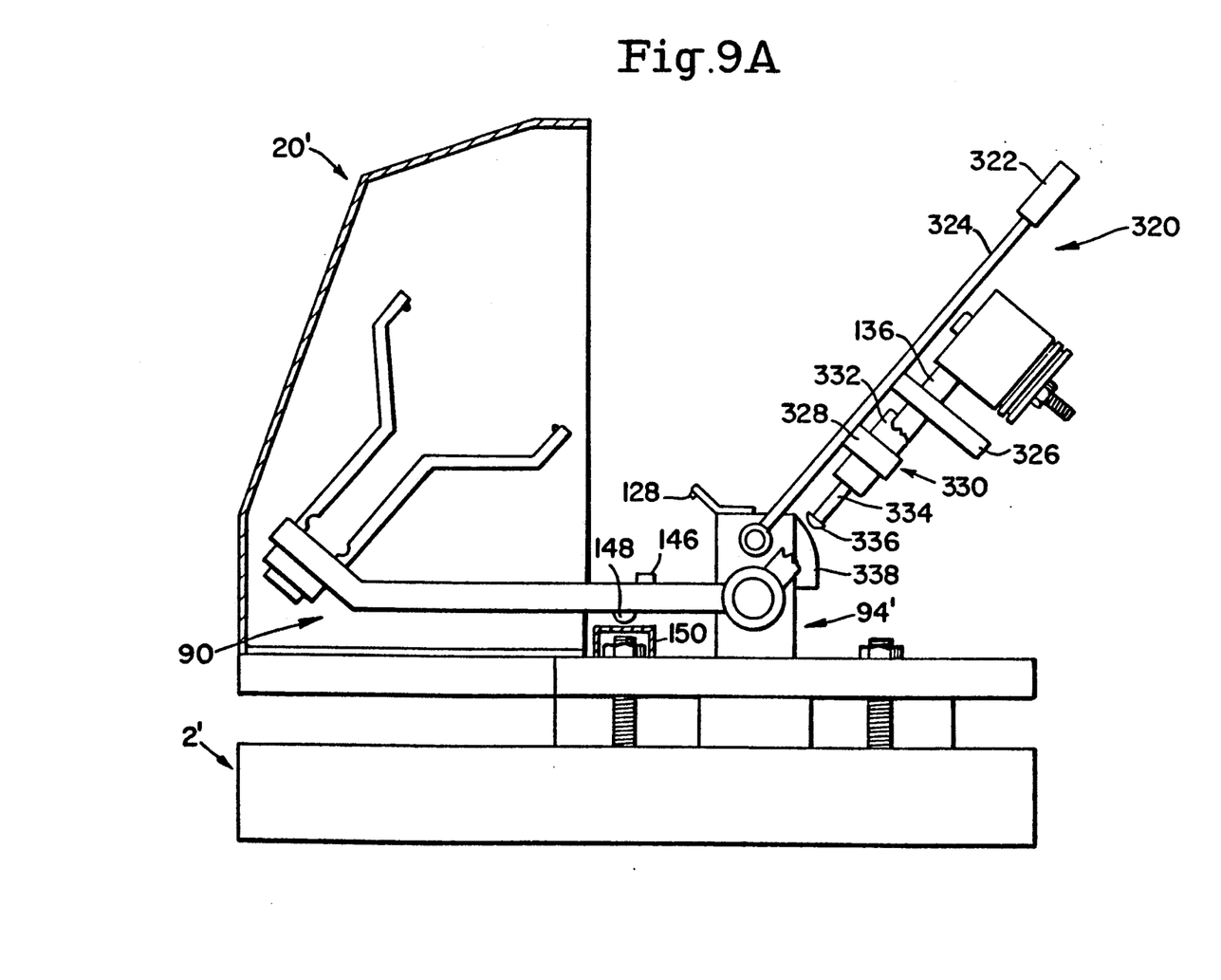
FIGS. 9A and 9B are side views of some elements of a bench gauge according to another embodiment of the invention, at two different moments of operation.
Figures 9B, 10:
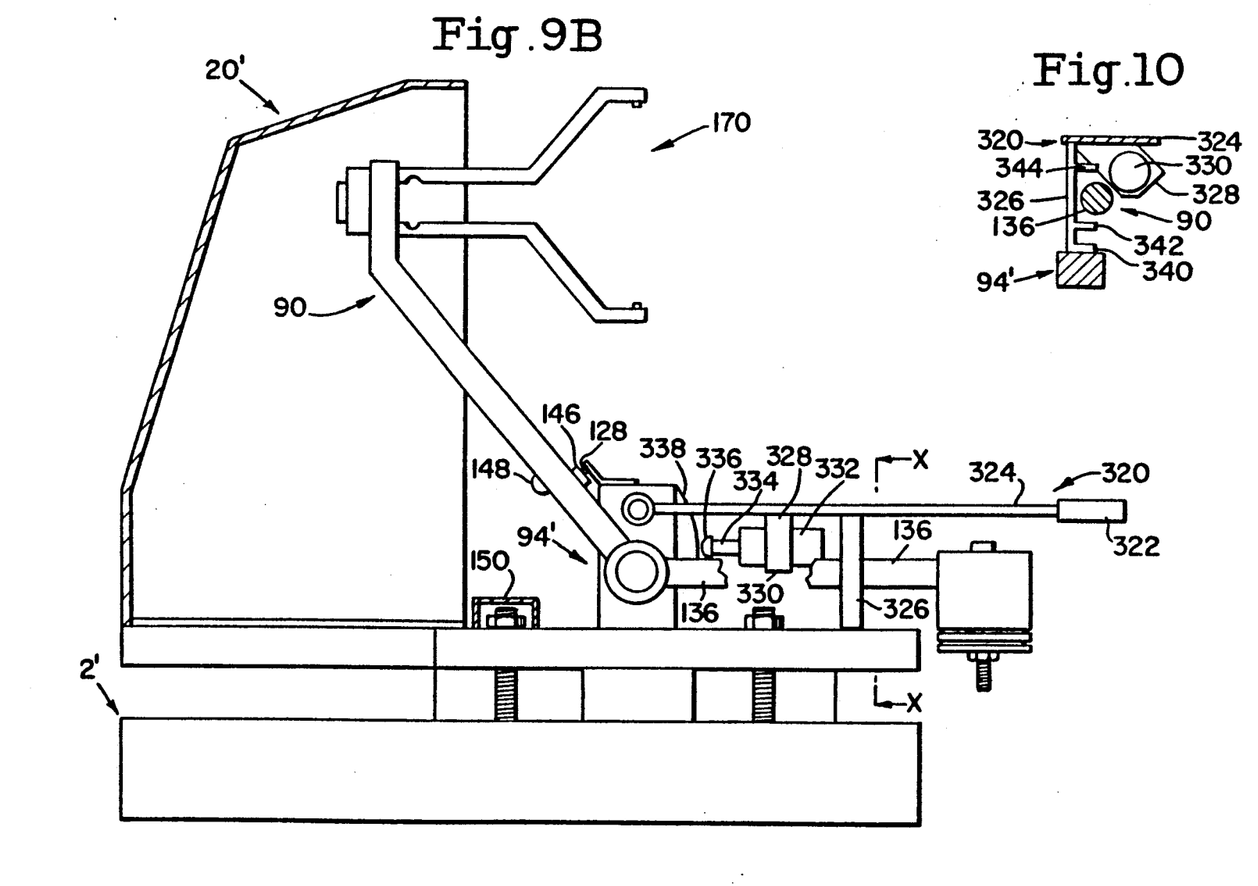
FIG. 10 is a sectional view of a detail of a part shown in FIGS. 9A and 9B, along the section X—X in FIG. 9B.

The manual actuation for the displacement of arms 90, 92, as shown in FIGS. 9A, 9B and 10, can be produced by displacing an actuation lever 320 adapted for rotating about an axis that is different from the axis of rotation of arm 90 and is obtained on support devices 94', coupled to a bed 2' in a similar way as that shown in FIG. 1 for the coupling of support 94 to bed 2.

Lever 320 has a handle 322 and a substantially flat elongated portion 324. To this portion 324 there are connected a transmission flange 326 and—by means of a junction element 328—a hydraulic damper 330 with a cylinder 332, a piston axially movable within cylinder 332 and comprising an elongated end 334 protruding from it, and a contact element 336 coupled to said end 334.

A shaped element, or cam, 338 is secured to support devices 94'.

Flange 326, also shown in FIG. 10, has a bent end 340 and limit stop elements 342 and 344, parallel to end 340, adapted for cooperating with diametrally opposite areas of the cylindrical surface of portion 136 of arm 90.

FIG. 9A schematically shows a bench for manual actuation wherein there are shown just bed 2', support devices 94', rotary arm 90 with actuation lever 320 and protection structure 20'. The asymmetric arrangement of bed 2' and protection structure 20' differs from that of the corresponding parts 2 and 20 in FIG. 1; this is due to the operator's need to reach one side of the bench for operating. Arm 90 is shown in FIG. 9A in a rest position, with the sensing means placed at the farthest distance from the workpiece; this distance is defined by the cooperation between the second reference abutment element 148 fixed to arm 90 and limit stop cap 150.

By making lever 320 rotate in a clockwise direction (with reference to FIG. 9A) limit stop element 344 contacts portion 136 of arm 90, forcing the whole arm to rotate in the same direction. From the moment in which contact element 336 contacts the surface of cam 338 the movement of lever 320 and that of arm 90 are dampened. Manually operated lever 320 continues its stroke until bent end 340 of flange 326 contacts a limit stop consisting in a surface portion of support devices 94' (FIG. 9B).

The rotation of arm 90 continues, dampened by damper 330, until contact between reference abutment element 146 and reference abutment 128 (FIG. 9B) occurs, said contact defining the correct position of the sensing means or gauges 170, 230 on the workpiece 42 to be checked.

In order to withdraw the gauges away from the workpiece, lever 320 is actuated so as to rotate in a counterclockwise direction (again reference should be made to FIGS. 9A and 9B) and limit stop element 342 urges the entire arm 90 to rotate in the same direction, in order to return to the position shown in FIG. 9A.

Figure 11:
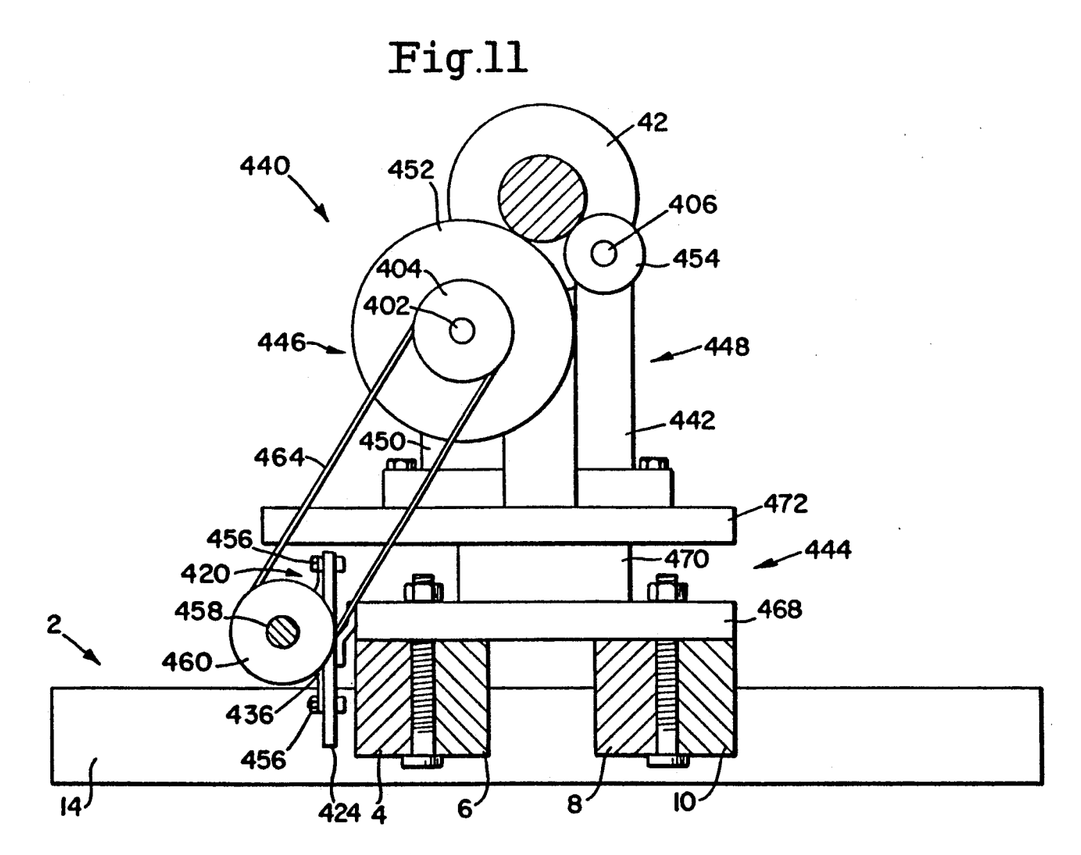
FIG. 11 is a side view of some elements of a bench gauge according to a third embodiment of the invention.
Figure 12:
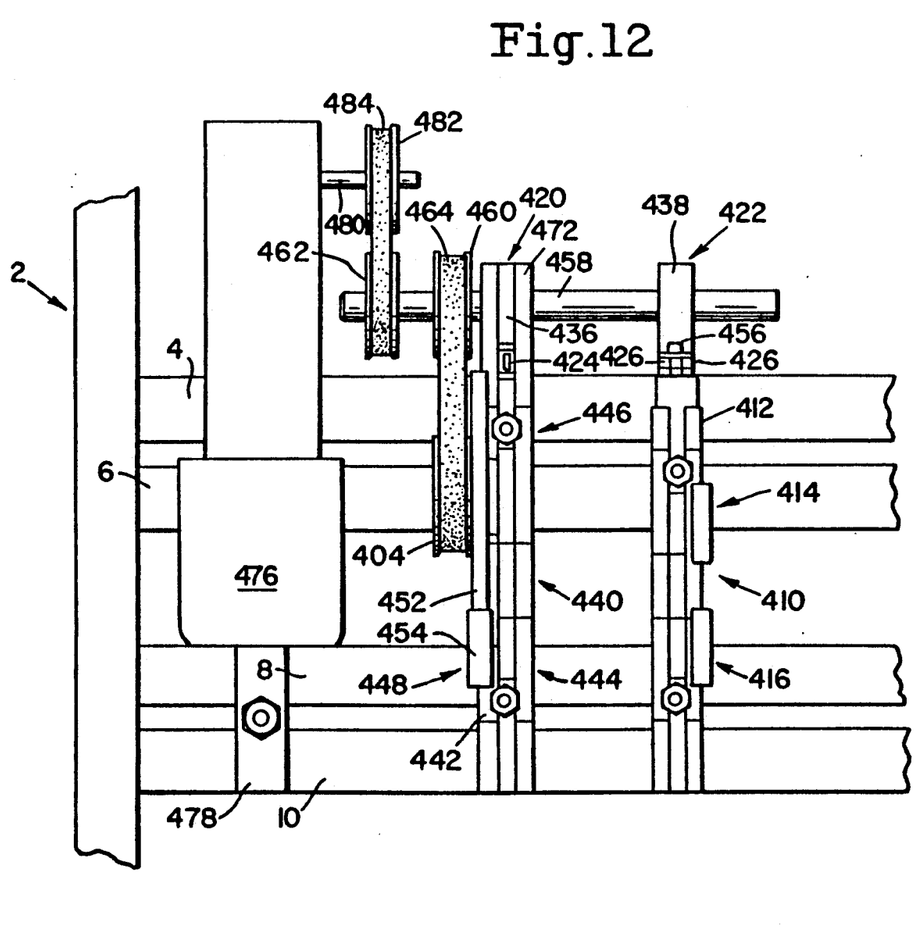
FIG. 12 is a plan view of some elements of a bench gauge according to said third embodiment of the invention.

FIGS. 11 and 12 show an embodiment of a bench gauge according to the present invention for checking a workpiece 42 in rotation.

The structure of the bench gauge is similar to that described hereinbefore, with the sole substantial difference in the construction of the rest devices that, in this case, have to drive workpiece 42 to accomplish the required rotation and/or enable this rotation. A rest device 440 is shown in both FIGS. 11 and 12, whereas a second rest device 410 is only shown in FIG. 12. Device 440 has a support member 444, with a coupling portion 468 fixed to bed 2, a central body 470 and a support part 472, all these parts being similar to corresponding parts of device 44.

Two different reference elements 446, 448 are coupled to part 472 in the same way as elements 46, 48 are coupled to part 72 of member 44 (see FIG. 1 and its pertaining description). Element 446 comprises a support part 450 and a circular element 452 adapted for freely rotating, with respect to part 450, about an axis defined by a pin 402 connected to part 450 in a way not shown in the figure. A first pulley 404 is connected to circular element 452 so as to rotate together and coaxially with it. Element 448 comprises a second support part 442 and a second circular element 454 for freely rotating with respect to part 442 about an axis defined by a pin 406 coupled to part 442 in a way not shown in the drawing. The circular elements 452, 454 define two relevant cylindrical surfaces lying opposite to each other, which are adapted for simultaneously contacting areas of a same cylindrical portion of the surface of workpiece 42 in such a way as to determine—with the cooperation of the second rest device 410—the correct positioning of the workpiece 42. The position of elements 446, 448 is furthermore adjustable (in a way not shown in the drawings, similar to the one of elements 46, 48 in FIG. 1) to keep fixed the position of the workpiece axis as the nominal dimensions of the different sections of the rest surfaces of the workpieces vary.

The second rest device 410 (visible in FIG. 12 only) comprises a second support member 412 that is substantially similar to member 444 and two second reference elements 414, 416, both substantially similar to element 448, arranged and adjusted in a symmetric way with respect to the axis of workpiece 42, so as to define— together with device 440—the correct positioning of said workpiece 42.

Control means include actuation means to cause the rotation of the workpiece 42 to be checked. The actuation means comprise transmission means with: said first pulley 404, a second (460), a third (462) and a fourth (482) pulley, a belt 464, a second belt 484 and adjustment means.

The adjustment means include two vertical support elements 420, 422 rigidly connected to section 468 of member 444 and to a corresponding part of member 412, each of them comprising a pair of longitudinal parallel flat bars 424, 426, respectively. Two bearings—not shown in the figures—are connected in a vertically adjustable way to said vertical support elements 420, 422, respectively, by means of adjustment means comprising junction elements 436, 438 locked by bolts 456 that pass through holes in elements 436, 438 and the opening formed between the pairs of flat bars 424, 426, and are suitably locked. A shaft 458 is supported by the bearings and so lies at one side of bed 2, parallel to bars 4, 6, 8 and 10, free to rotate about its axis. The second and the third pulley 460, 462 are coaxial and rigidly fixed to shaft 458 and adapted to rotate together with it. The first pulley 404 and the second pulley 460 are substantially coplanar and the belt 464 cooperates with said first and second pulleys in order to transmit to the first (404) the motion of the second (460). The actuation means further comprise an electric motor 476 (shown in FIG. 12) that is supported by a support element 478 fixed to bed 2 by means of bolts in the way shown for clamping the other elements of the bench. A spindle 480 coming out of motor 476 carries the fourth pulley 482, that is substantially coplanar to said third pulley 462, and is connected to it by means of the second belt 484. The rotation commanded by motor 476 to the fourth pulley 482 is so transmitted to the third pulley 462 (by means of belt 484), to the second pulley 460 (by means of the rotation of shaft 458), to the first pulley 404 (by means of belt 464) and to workpiece 42 (by means of circular element 452).

As the nominal dimensions of the rest section of workpiece 42 vary, the adjustment of elements 446, 448 causes, among the other things, transversal displacements of circular element 452 and of its associated pulley 404; in order to keep the tension of belt 464 constant, the position of the second pulley 460 is consequently set, by adjusting the vertical position of shaft 458, i.e. of the bearings on support elements 420, 422.

The position of the fourth pulley 482, or that of motor 476, is also set (in a way not shown in the drawing) by effecting transversal adjustments, in order to keep the tension of the second belt 484 substantially constant.

Another embodiment—not shown in the figures—of the apparatus according to the invention, provides for a structure quite similar to that shown in FIGS. 1 and 2, with fixed rest devices 40, and enables to check the workpiece 42 during its rotation. In such embodiment the support and protection means comprise additional support members with two oppositely arranged centres, which are sustained by elements fixed to bed 2 in the way repeatedly described hereinbefore (for example like devices 40 in FIGS. 1 and 2) and are longitudinally adjustable along guides 16, 18. These centres are aligned to define as axis and can rotate about said axis; the control means comprise an electric motor coupled to one of said centres, whereas the other centre ("dead centre") is free to rotate "idle".

The loading of a workpiece 42 to be checked in said apparatus occurs first on the reference devices 40; then the dead centre is brought to contact an end of the workpiece 42 and urges the other end of said workpiece against the other centre in such a way that the axis defined by the centres and the geometrical axis of the workpiece 42 coincide and the workpiece 42 is slightly raised and remains supported by the centres only; then the motor is actuated so as to provide the workpiece rotation.

It should be realized that the workpiece 42 can be pushed by the dead centre towards the other centre without having to approach the stationary workpiece from both sides. This possibility is provided as there are no sensing means coupled to the workpiece rest devices during the workpiece loading phase, and consequently during said phase the sensing means are not subjected to possible slidings and/or damages.

We claim:

1. An apparatus for checking features of workpieces with rotational symmetry, comprising sensing means including a plurality of first gauges (170); support and protection means with a base (2; 2') defining first longitudinal guides (16, 18), rest devices (40; 410; 440) adjustably fixed to the first guides for defining a first horizontal geometrical axis along which the workpiece to be checked is to be mounted and a movable support structure (88) including a first frame (154) defining a second longitudinal guide for supporting the first gauges (170) in independently adjustable positions, each of the first gauges being coupled to the frist frame substantially in a single limited zone, the support structure (88) being rotatable about a second geometrical horizontal axis arranged below the first horizontal axis, in correspondence to a vertical geometrical plane passing through the first axis, to allow said first gauges (170) to be moved in and out of measuring position simultaneously in a direction essentially horizontally tangential to the workpiece, the support structure being counterbalanced; and control means (232; 300; 320; 476) for controlling the displacement of said support structure (88).

2. The apparatus according to claim 2, wherein the rest devices (40; 410, 440) are longitudinally adjustable along said longitudinal guides (16, 18).

3. The apparatus according to claim 2, wherein said rest devices (40; 410, 440) are transversally adjustable, in order to keep the geometrical axis of the workpiece in a constant position, as the diametrical dimensions of the workpiece vary in correspondence to the rest devices (40; 410, 440).

4. The apparatus according to claim 3, wherein each of said rest devices (40; 410; 440) comprises a support member (44; 412; 444) arranged on said base (2; 2') according to a transversal direction and two reference elements (46, 48; 414, 416, 446, 448) adjustable on the support member (44; 4122; 444) along said transversal direction, while maintaining stationary the position of said first horizontal geometrical axis.

5. The apparatus according to claim 4, wherein each of said reference elements (46, 48) comprises two rest surfaces (52, 54) sloping according to a first and a second inclination, the reference elements (46, 48) being adapted to be arranged along said transversal direction in such a way that their associated rest surfaces (52, 54) which have an identical inclination are opposite.

6. The apparatus according to claim 4, wherein each of said reference elements (414, 416, 446, 448) comprises a substantially circular element (452, 454) adapted for rotating with respect to the support member (412, 444) about an axis passing through its centre, the control means (232; 300; 320; 476) comprising actuation means (476) connected to at least one of said circular elements (452) for transmitting to it a rotational motion.

7. The apparatus according to claim 6, wherein said actuation means comprise an electric motor (476) and transmission means (404, 458-464, 480-484) connecting said electric motor (476) to said at least one circular element (452).

8. The apparatus according to claim 7, wherein said transmission means comprise a first pulley (404) rigidly fixed to said at least one circular element (452), a second (460) and a third (462) pulley, mutually coaxial and synchronously rotating, a fourth pulley (482) directly connected to the electric motor (476), a belt (464) adapted for cooperating with the first (404) and the second (460) pulley, a second belt (484) adapted for cooperating with said third (462) and fourth (482) pulley and adjustment means (420-438, 456, 478) for said second (460) and third (462) pulley and for said electric motor (476).

9. The apparatus according to claim 2, wherein the support and protection means (2; 20; 40; 88) comprise two additional support members with two oppositely arranged centres adapted for cooperating with the ends of the workpiece to be checked, the control means (232; 300; 320; 476) comprising an electric motor coupled to one of said centres for transmitting to it a rotational motion, the additional support members being longitudinally adjustable along the first longitudinal guides (16, 18) of the base (2, 2').

10. The apparatus according to claim 2, wherein said support structure (88) comprises two arms (90, 92) coupled to the first frame (154) and two support devices (94, 96) fixed to the base (2, 2') and adapted for defining said second horizontal geometrical axis, for the rotation of the arms (90, 92) and of the first frame (154).

11. The apparatus according to claim 10, wherein the support structure (88) comprises an additional frame (210) coupled to the first frame (154) substantially in a single limited zone and adjustable along the second guide (164), the additional frame (210) defining a third guide (220), the sensing means comprising second gauges (230), each coupled to the additional frame (210) substantially in a single limited zone and adjustable along the third guide (220).

12. The apparatus according to claim 11, wherein each arm (90, 92) comprises a first portion (132) connected to the first frame (154), a second portion (134) coupled to the first portion (132) and connected to one of the support devices (94, 96) and a third portion (136) carrying an adjustable counterweight (142), for counterbalancing the support structure (88), the second (134) and the third (136) portions being arranged at opposite sides with respect to said vertical geometrical plane.

13. The apparatus according to claim 10, wherein the support devices (94, 96) are adjustable in a longitudinal direction along the first guides (16, 18).

14. The apparatus according to claim 12, wherein the control means (232; 300; 320; 476) comprise an actuation lever (320) with a handle (322), the actuation lever (320) being adapted for cooperating with said third portion (136) of one of the arms (90, 92) for bringing the support structure (88) and the sensing means (170, 230) from the rest position to the measuring position and vice versa.

15. The apparatus according to claim 14, wherein the control means (232; 300; 320; 476) comprise a damper (330) fixed to the actuation lever (320) and adapted for cooperating with one of the support devices (94').

16. The apparatus according to claim 10, wherein the control means (232; 300; 320; 476) comprise automatic actuation means (300, 302) and a lever (304) rigidly connected to one of said arms (90, 92), the automatic actuation means (300, 302) being adapted for cooperating with the lever (304) for bringing the support structure (88) and the sensing means (170, 230) from the rest position to the measuring position and vice versa.

17. The apparatus according to claim 12, wherein the counterweight (142) comprises a variable number of elements (232) depending on the number of the first and second gauges (170, 230).

18. The apparatus according to claim 10, wherein the support and protection means (2; 20; 40; 88) comprise a plate (260) with holes (272) connected to the first frame (154), locking elements (270) coupled to said plate (260)

and a raceway (280) secured to one of said arms (90, 92), the control means (232; 300; 320; 476) including electrical cables (278) connected to the sensing means (170, 230) and coupled to the locking elements (270) along the plate (260) and inserted in the raceway (280).

19. The apparatus according to claim 2, wherein the support and protection means (2; 20; 40; 88) comprise guide devices (240, 242) adapted for limiting in a longitudinal direction the positioning of the workpiece to be checked, the guide devices (240, 242) being coupled to the base (2, 2') and adjustable in a longitudinal direction along said first longitudinal guides (16, 18).

20. The apparatus according to claim 19, wherein said guide devices (240, 242) comprise threaded through holes (244) and pointed reference screws (246) adapted to be inserted in said threaded through holes (244) for cooperating with the ends of the workpiece (42) and for enabling the adjustment of the rest devices (40; 410, 440).

21. The apparatus according to claim 2, wherein the support and protection means (2; 20; 40; 88) comprise a protection structure (20, 20') with at least a halfshell (22, 24) and bars (26, 28) coupled to said at least one halfshell (22, 24), the protection structure (20, 20') being coupled to said base (2, 2') and longitudinally adjustable along said first guides (16, 18).

* * * * *

UNITED STATES PATENT AND TRADEMARK OFFICE
CERTIFICATE OF CORRECTION

PATENT NO. : 5,086,569
DATED : February 11, 1992
INVENTOR(S) : Mario POSSATI et al It is certified that error appears in the above-identified patent and that said Letters Patent is hereby corrected as shown below:

Column 3, line 19, --example just one is shown in figure 4A) consisting of-- should appear before "screws".

Column 11, line 12, the spelling of "frist" should be corrected to read --first--.

Column 11, line 23, "claim 2" should read --claim 1--.

Column 11, line 37, "4122" should read --412--.

Signed and Sealed this

Twenty-ninth Day of June, 1993

Attest:

MICHAEL K. KIRK

*Attesting Officer*      Acting Commissioner of Patents and Trademarks